United States Patent
Huckstep et al.

(10) Patent No.: US 11,602,468 B2
(45) Date of Patent: Mar. 14, 2023

(54) METHODS AND APPARATUS FOR INCREASING THE EFFECTIVENESS OF WHEELCHAIR TRAINING

(71) Applicant: REHABILITATION INSTITUTE OF CHICAGO, Chicago, IL (US)

(72) Inventors: Amy Huckstep, Crete, IL (US); Elizabeth Ann Petersen, Wilmette, IL (US); Jacob Wat, Huntley, IL (US); Melanie Claire Galantino, Springfield, PA (US); Justin Omid Navadzadeh, Volo, IL (US); Jose Roberto Roches, Northbrook, IL (US); Kevin Brenner, Chicago, IL (US)

(73) Assignee: Rehabilitation Institute of Chicago, Chicago, IL (US)

( * ) Notice: Subject to any disclaimer, the term of this patent is extended or adjusted under 35 U.S.C. 154(b) by 878 days.

(21) Appl. No.: 16/438,665

(22) Filed: Jun. 12, 2019

(65) Prior Publication Data
US 2019/0374833 A1 Dec. 12, 2019

Related U.S. Application Data

(60) Provisional application No. 62/684,083, filed on Jun. 12, 2018.

(51) Int. Cl.
*A61G 5/10* (2006.01)
*B62H 1/00* (2006.01)

(52) U.S. Cl.
CPC ........... *A61G 5/104* (2013.01); *A61G 5/1089* (2016.11); *A61G 5/10* (2013.01); *B62H 1/00* (2013.01)

(58) Field of Classification Search
CPC ........ A61G 5/10; A61G 5/104; A61G 5/1089; B62H 1/00
(Continued)

(56) References Cited

U.S. PATENT DOCUMENTS

| 3,256,040 A | 6/1966 | Mize et al. |
| 3,580,591 A * | 5/1971 | Coffey ................. A61G 5/1089 280/5.32 |

(Continued)

FOREIGN PATENT DOCUMENTS

| JP | 3028282 | 8/1996 |
| WO | 2017020875 | 2/2017 |

OTHER PUBLICATIONS

Kirby et al. "New wheelie aid for wheelchairs: Controlled trial of safety and efficacy" Mar. 2001.

*Primary Examiner* — Jacob B Meyer
*Assistant Examiner* — Felicia L. Brittman
(74) *Attorney, Agent, or Firm* — Polsinelli PC

(57) ABSTRACT

A device for supporting a wheelchair includes a frame and a support system. The first end of the frame is attached to an axle of the wheelchair. The second end of the frame is attached to a wheel for allowing translation of the device over a surface. The support system is coupled to the frame and may be positioned to catch a back of the wheelchair upon reclining of the wheelchair during a wheelie. The position of the support system with respect to the frame is adjustable in order to catch the wheelchair at varying angles of reclining. As the user of a wheelchair develops skill in performing a wheelie, the position of the support system may be moved further away from the wheelchair.

19 Claims, 14 Drawing Sheets

(58) Field of Classification Search
USPC .......................................................... 280/755
See application file for complete search history.

(56) References Cited

U.S. PATENT DOCUMENTS

| | | | |
|---|---|---|---|
| 3,848,883 A * | 11/1974 | Breacain | A61G 5/1089 |
| | | | 280/5.32 |
| 4,154,452 A | 5/1979 | Newman | |
| 4,227,740 A | 10/1980 | East | |
| 4,565,385 A | 1/1986 | Morford | |
| 4,962,942 A | 10/1990 | Barnett et al. | |
| 5,330,221 A | 7/1994 | Sutton | |
| 6,047,979 A | 4/2000 | Kraft et al. | |
| 6,062,600 A | 5/2000 | Kamen et al. | |
| 6,135,480 A | 10/2000 | James | |
| 6,357,793 B1 | 3/2002 | Dickie | |
| 6,467,788 B1 | 10/2002 | Li et al. | |
| 6,530,598 B1 | 3/2003 | Kirby | |
| 7,114,731 B2 | 10/2006 | Malrick | |
| 8,075,011 B1 | 12/2011 | Duzzny | |
| 2006/0097478 A1 | 5/2006 | Goertzen et al. | |
| 2007/0018443 A1 | 1/2007 | Wilmot | |
| 2012/0161484 A1 | 6/2012 | Huang | |

* cited by examiner

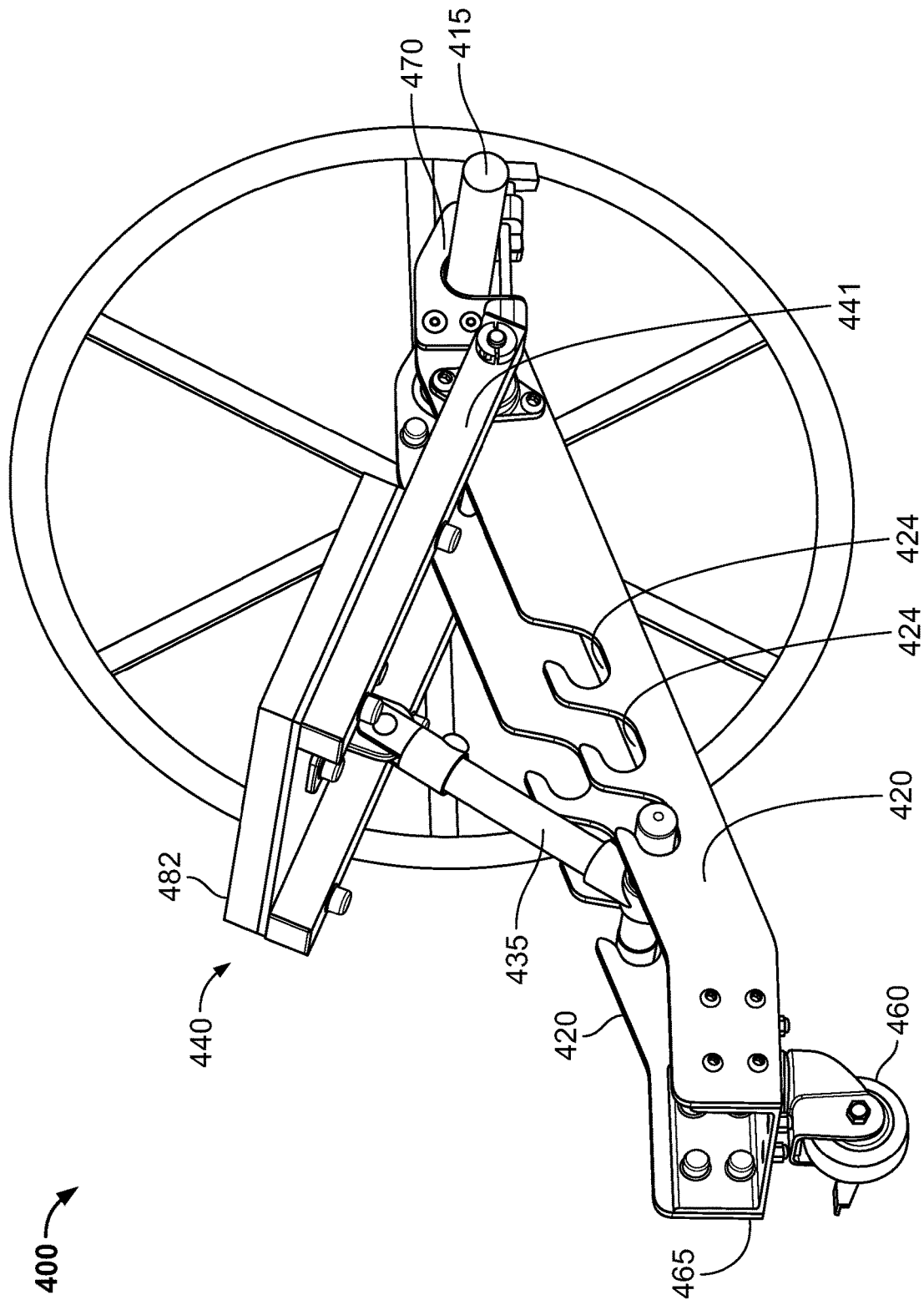

METHODS AND APPARATUS FOR INCREASING THE EFFECTIVENESS OF WHEELCHAIR TRAINING

RELATED APPLICATIONS

This patent claims priority to U.S. Provisional Patent Application Ser. No. 62/684,083, filed Jun. 12, 2018, entitled "Methods and Apparatus for Increasing the Effectiveness of Wheelchair Training." The entirety of U.S. Provisional Patent Application Ser. No. 62/684,083 is incorporated herein by reference.

FEDERALLY SPONSORED RESEARCH OR DEVELOPMENT

None.

NAMES OF THE PARTIES TO A JOINT RESEARCH AGREEMENT

None.

BACKGROUND

Approximately 2 million people in the United States use a wheelchair. Each year, many people suffer injuries causing paraplegia and are required to use a wheelchair for mobility. There are approximately 130,000 people who suffer from such injuries in the United States. New wheelchair users must learn critical skills such as wheelies which enable users to have the mobility needed for everyday life. A wheelie is when the wheelchair user tips up the front wheels of the wheelchair and balances on the two larger wheels in the back and is used to have greater wheelchair control in different terrains as well as getting over small increases in elevation such as curbs. The challenge lies in training for this skill. Wheelchair users initially do not have full command or control in the wheelchair. Since learning wheelies requires learning the balance point and how to control while in that balance point, the wheelchair often tip backwards before the skill is mastered.

Current wheelchair training takes place with a physical therapist present to help catch the user. During wheelie training, novice users face the risk of falling backwards in the wheelchair. If the wheelchair falls all the way backwards and impacts the ground, the risk for injury to the head or back is increased. When physical therapists are working with wheelchair users, the current method of protecting against falls is for the physical therapist to stand behind the wheelchair user while they perform wheelies and catch them as they fall past their tipping point. The physical therapist may hold a strap that is attached to the axle of the wheelchair so that when the wheelchair tips, they put force on the strap to the back of the chair and catch the weight of the falling wheelchair user. With the current strap system, there must be one-on-one attention from the physical therapists and the patients. Further, the weight of the falling wheelchair is often more than 150 lbs. that the physical therapist must catch. This can lead to a risk of injury for the physical therapists since they must catch all of the wheelchair and the users' weight and momentum.

BRIEF SUMMARY

A device for supporting a wheelchair including a frame and a support system. The frame comprises two rails extending from a first end of the frame to a second end of the frame. The first end of the frame is configured to be attached to an axle of the wheelchair. The second end of the frame is configured to be attached to a wheel for allowing translation of the device over a surface. The frame is configured to be positioned behind a back of the wheelchair. The support system is coupled to the frame, the support system being positioned at an angle with respect to the frame to catch the back of the wheelchair upon reclining of the wheelchair. The position of the support system with respect to the frame is adjustable in order to catch the wheelchair at varying angles of reclining.

A method for training a wheelchair user to perform wheelies comprises the following steps:
  a. Providing a device having a frame with two notched rails and a support system coupled to the frame and capable of being positioned at various angles with respect the frame for supporting the weight of the wheelchair and the wheel chair user;
  b. Positioning the device behind a back of the wheelchair and attaching the first end of the frame to an axle of the wheelchair;
  c. Positioning the support system to a desired angle; and
  d. Instructing the user to perform wheelies.

When the user performs a wheelie and loses balance, the support system catches the back of a wheelchair.

BRIEF DESCRIPTION OF THE SEVERAL VIEWS OF THE DRAWINGS

While the appended claims set forth the features of the device of the present application with particularity, the various embodiments of the device may be best understood from the following detailed description taken in conjunction with the accompanying drawings of which:

FIG. 15 depicts a perspective view of another embodiment of the present application, device 400, shown coupled to an axle of a wheelchair.

FIG. 16($b$) is a rear view of the device of FIG. 15.

FIG. 16($c$) is a side view of the device of FIG. 15.

DETAILED DESCRIPTION

Through the use of this tool for wheelchair training, the physical strain on the physical therapist will be reduced, a single physical therapist will be able to train multiple wheelchair users at the same time, and the risk of injury to wheelchair users during training will be lowered.

The disclosed exemplary devices (100/200/300/400) use hooks (170/270/370/470) to attach to a wheelchair's axle (115/215/315/415) and prop up a small bed (140/240/340/440) that catches the back of the wheelchair (110/210/310/410) to prevent it from tipping backward beyond the center of gravity of the wheelchair (110/210/310/410) and user. Opposite the hooks (170/270/370/470) the device (100/200/300/400) is attached to a 360-degree wheel (160/260/360/460) that allows for uninhibited mobility. The hooks and the wheel attach to opposite ends of two toothed rails (120/220/320/420). The rails allow therapists and users to easily adjust the angle of the T-bar (135/235/335/435), which in turn adjusts the angle of the bed (140/240/340/440) on which the wheelchair (110/210/310/410) is caught.

The weight of the device (100/200/300/400) may be supported entirely by the wheel (160/260/360/460) and the stationary axle (115/215/315/415) so that it does not interfere with the user's balance. The hooks (170/270/370) (or a curved surface 470) mounted on the axle (115/215/315/415) allow for very quick attachment and removal of the device (100/200/300/400) which maximizes the time that may be spent on actual training and makes the device (100/200/300) user-friendly. The hooks (170/270/370/470) and adjustable bed (140/240/340/440) allow the device (100/200/300/400) to be compatible with any rigid wheelchair. The wheel (160/260/360/460) enables 360 degrees of mobility. The ease of attachment of this device (100/200/300/400) allows for training in both group settings and in a comfortable environment with friends and family. The exemplary device (100/200/300/400) may be installed and configured without the use of tools.

Figure 1:
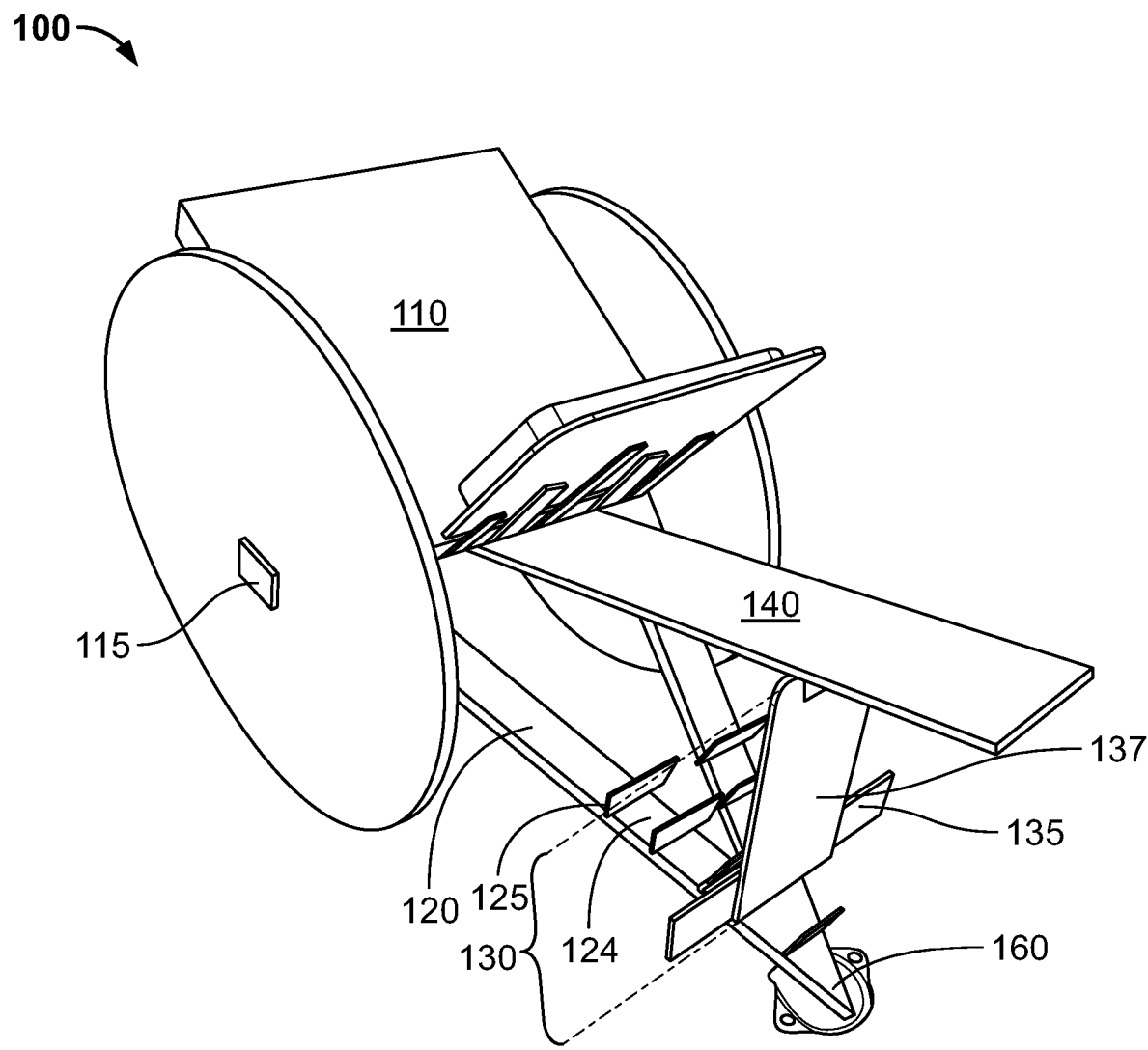
FIG. 1 depicts an embodiment of the device of the present application, device 100, attached to a mock wheelchair.

As depicted in FIG. 1, device (100) can attach to a mock wheelchair (110) by its axle (115). The rails (120) are shown with the teeth (125) protruding upwardly. The support system (130) is comprised of the movable T bar (135) and the support bar (137) which is attached to the bed (140). The bed (140) can be lifted up to move the positioning of the movable T-bar (135) into the different notches (124) between the teeth (125). This allows the wheelchair (110) to lean back to different angles before making contact with the bed (140) to catch the wheelchair (110) and the user. The wheel (160) is directly behind the wheelchair (110) in order to allow for the user to attempt dynamic wheelies while in training.

Figure 2:
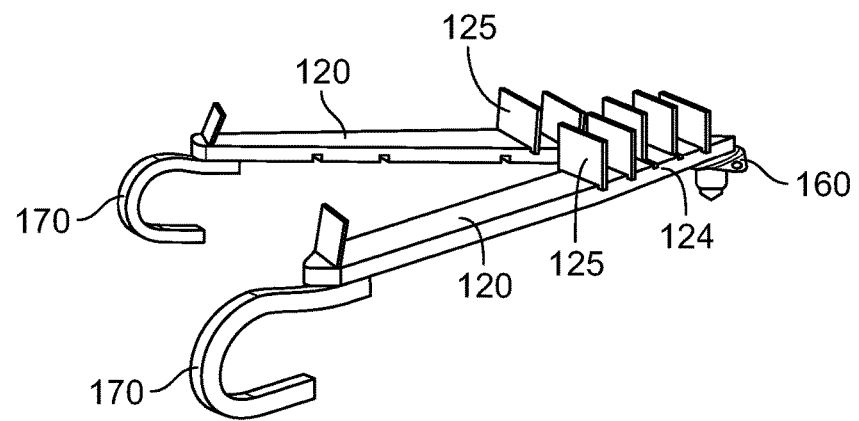
FIG. 2 depicts a perspective view of the device of FIG. 1.

FIG. 2 depicts the device (100) disconnected from a wheelchair (110) and without the support system (130) and bed (140) attached. The two rails (120) are attached using the wheel (160) that permits the user to attempt dynamic wheelies. At the other end of the rails (120) are hooks (170) that are used to connect the device (100) to the wheelchair (110) when in use. Also attached to the rails (120) are the teeth (125) which create notches (124) for the movable T-bar (135) to sit within in order to stabilize the placement of the bed (140) at a certain angle.

Figure 3:
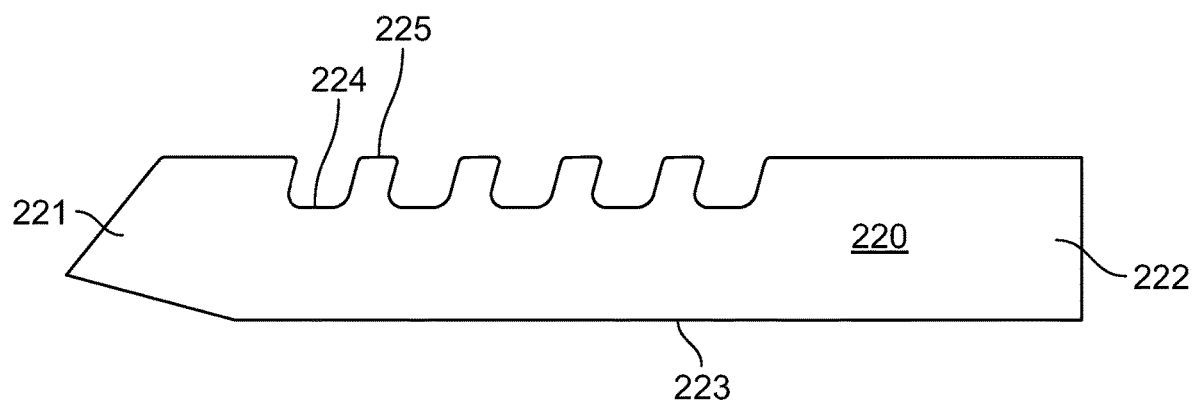
FIG. 3 depicts a rail component used for another embodiment of the present application, device 200.
Figure 4:
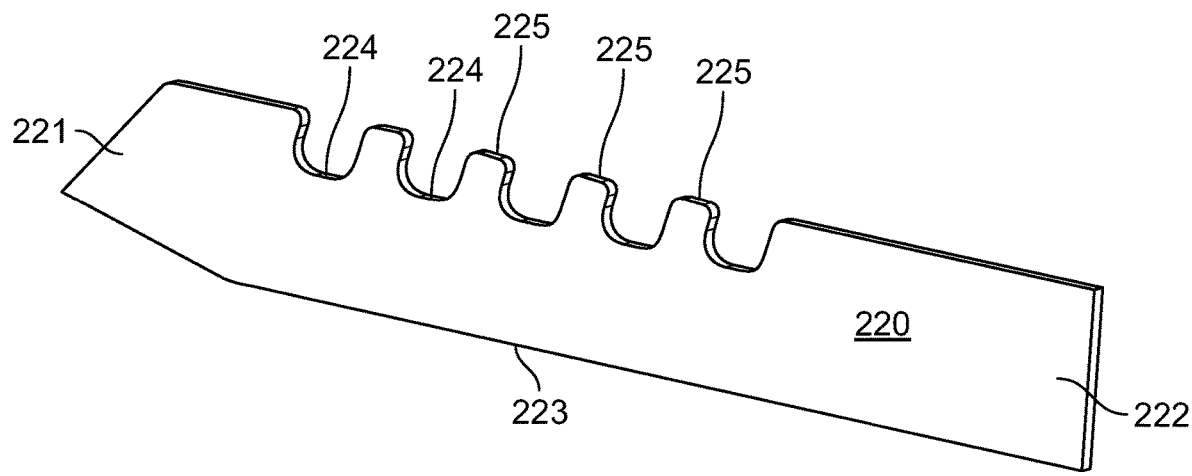
FIG. 4 depicts a perspective view of the rail shown in FIG. 3.

FIG. 3 depicts the rail (220), the rail design used in both device 200 and 300. In this embodiment of the rail (220) the pointed end (221) is cut in order for the bottom of the rail (223) to be removed from the floor by 15 degrees when the square end of the rails (222) is connected to the wheelchair axle (215) by a hook (270). FIG. 4 depicts a perspective view of the rail (220) of FIG. 3. It shows the pointed (221) and square end (222) of the rail as well as the bottom of the rail (223) and the teeth (225) and notches (224) on the finished rails (220).

Figure 5:
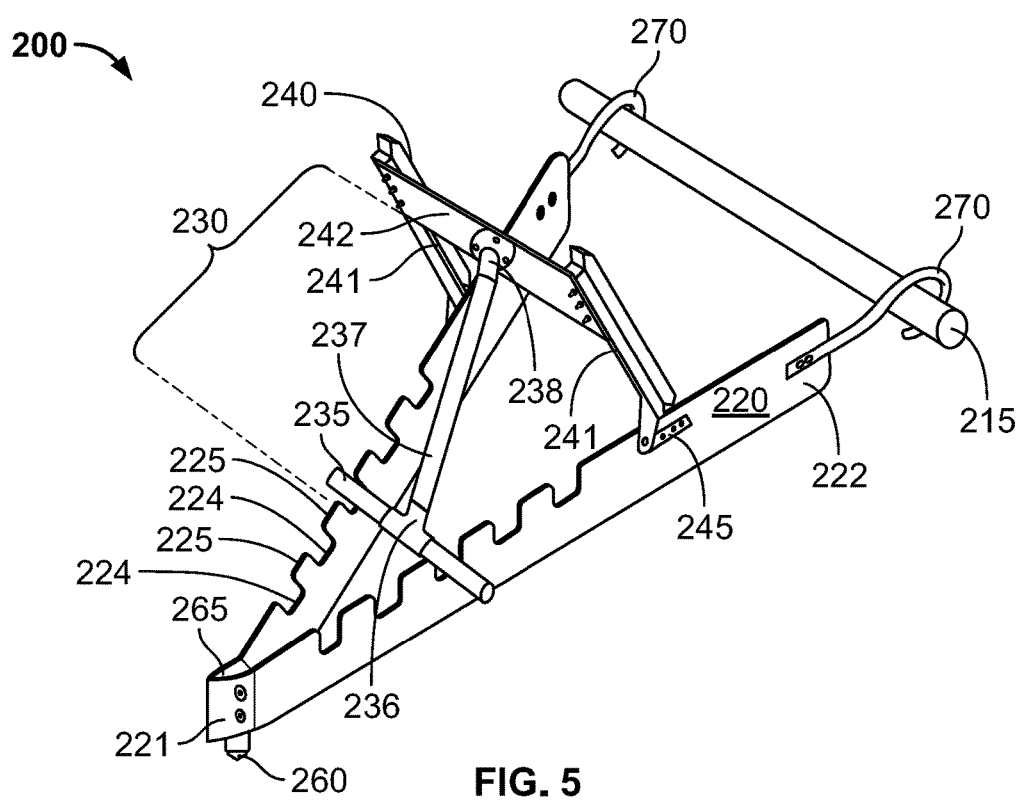
FIG. 5 depicts a fully assembled further embodiment of the device of the present application, device 200.

FIG. 5 depicts a device (200) with all parts attached. The hooks (270) are hooked around a wheelchair axle (215) while the hooks are attached to the square end (222) of the rails (220). The two pointed ends (221) of the rails (220) are connected by a connecting block (265) that is connected to the wheel (260). On either side of the rails (220) is a hinge (245) that connects the arms (241) of the bed (240) to the plate (242) of the bed (240). The bed (240) is then connected to the movable support (230) through the use of a rail end hinge (238) which is attached to the support bar (237) that leads into the T connector (236) which engages the movable T-bar (235). The movable T-bar (235) may be moved into the notches (224) between the teeth (225) of the rails (220) in order to adjust the angle between the bed (240) and the wheelchair (210). The notch (224) in which the movable T-bar (235) may be inserted can be changed by lifting the bed (240) which in turn lifts the entire support (230) and the movable T-bar (235) can then be placed between the appropriate teeth (225). By moving the movable T-bar (235) into a different notch (224), the height of the wheelie the user can accomplish is changed, therefore allowing the user to master the skill of finding their point of gravity. This controls how far back the user can tip the wheelchair (210) before the wheelchair (210) will come into contact with the bed (240). As the user develops the skill, the movable T-bar (235) can be moved progressively toward the notch (224) furthest away from the wheelchair (210) allowing the user to balance on their own without any intervention until their center of gravity is no longer under them.

Figure 6:
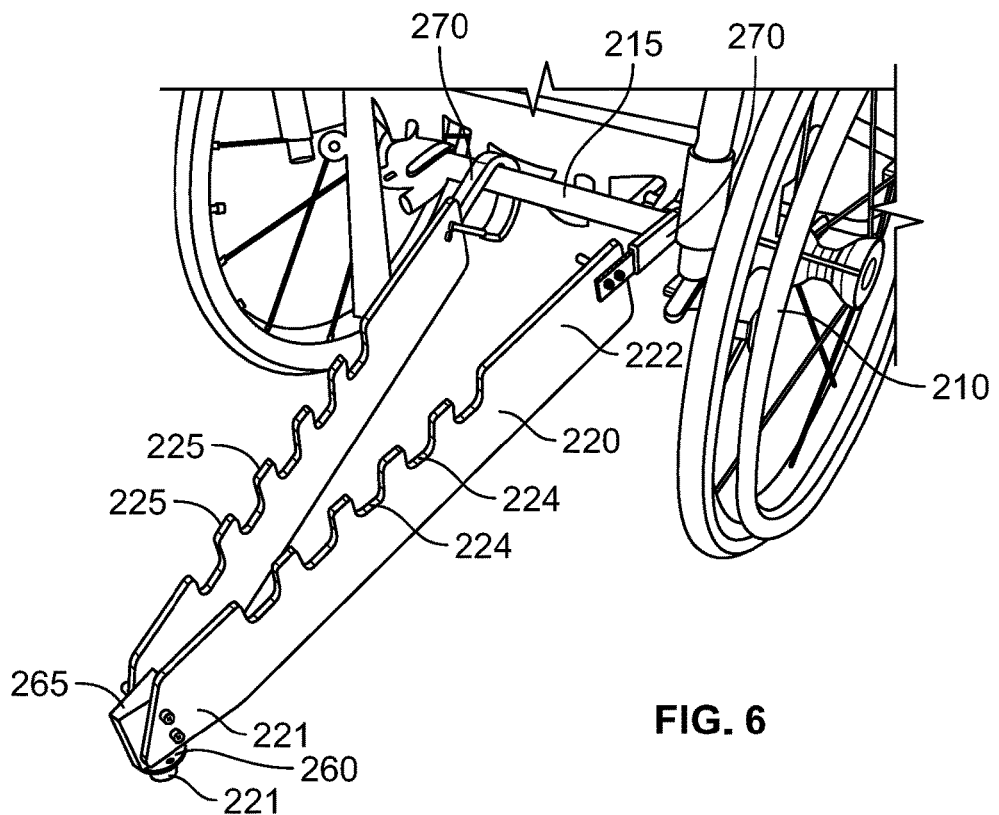
FIG. 6 depicts the device of FIG. 5 with only the rail components attached to a wheelchair.

FIG. 6 depicts the device (200) attached to a wheelchair (210) without the support (230) or bed (240). The angled ends (221) of the rails (220) are attached to the connecting block (265) and the connecting block is then attached to the wheel (260) to allow the user to perform a dynamic wheelie where the user can move in a circle while still in the wheelie. The device (200) is then attached to the wheelchair axle (215) through hooks (270) that are attached to the square end (222) of the rails (220). The notches (224) and teeth (225) allow the adjustment of the support (230) and concurrently the bed (240) which allows the user more freedom to find their center of balance when performing a wheelie before falling backward.

Figure 7:
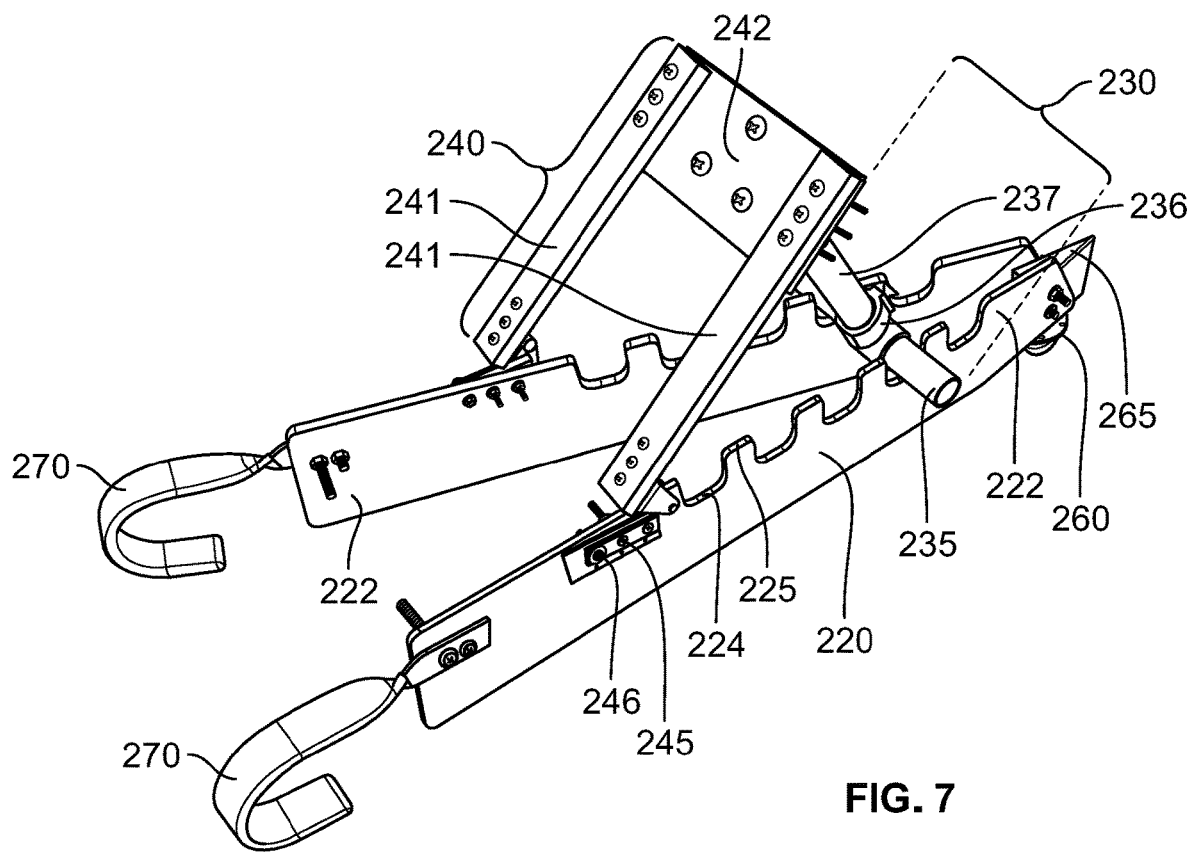
FIG. 7 depicts a top, front view of the device of FIG. 5.

FIG. 7 depicts a top, front view of the device (200). The hooks (270) are used to connect the device (200) to the wheelchair (210). The hooks (270) are attached to the rails (220) on the square end (222) of the rails (220). Further down the rails is the hinge (245) that connects the rails (220) to the bed (240). Between the hinge (245) and the rails (220) are hinge wedges (246) that ensure the arms (241) of the bed (240) are parallel rather than angled like the rails (220). The arms (241) are attached to the hinges (245) and coupled together with the plate (242). A crossbar on the back of the wheelchair (210) collides with the arms (241) when the user of the wheelchair (210) loses their balance in the wheelie position and tips backwards. The arms (241) provide multiple points of contact with both curved and straight crossbars. Attached to the bed (240) is the support (230) which is connected to the plate (242) through a rail end hinge (238) (shown in FIG. 8). The support 230 includes the movable support bar (237) that is connected to a T-connection (236)

that is attached to the movable T-bar (235). The support (230) is adjusted by raising the bed (240) and moving the movable T-bar (235) to fit in between certain notches (224) between the teeth (225) on the rail (220). The further distance the T-bar (235) is from the wheelchair (210) the larger the angle between the wheelchair (210) and the bed (240). At the angled end (221) of the rails (220) is the connecting block (265) that connects the two rails (220) as well as the wheel (260) that allows the device (200) to move with the wheelchair (210) when attempting static and dynamic wheelies.

Figure 8:
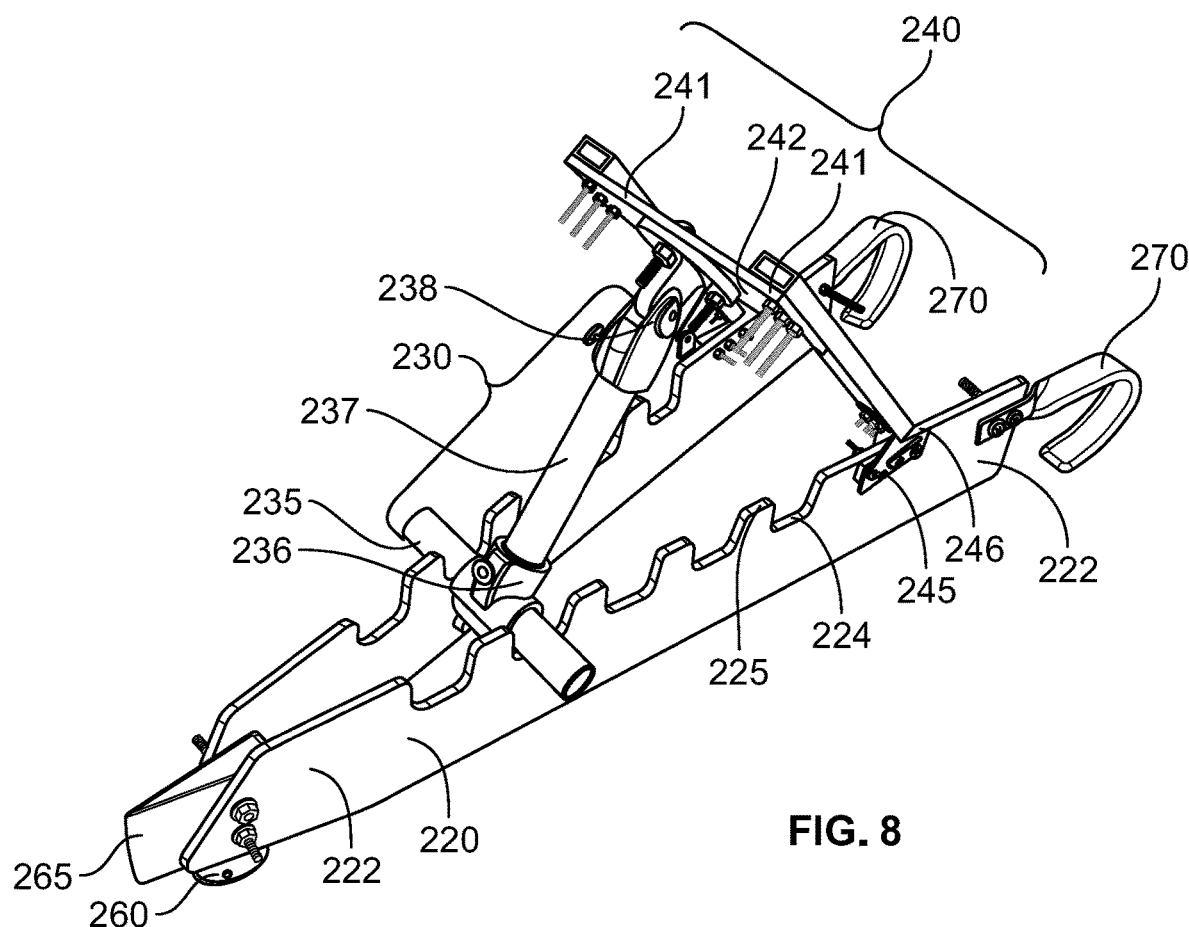
FIG. 8 depicts a top, rear view of the device of FIG. 5.

FIG. 8 depicts a top, rear view of the device (200). The wheel (260) of the device (200) that enables the device (200) to move with the wheelchair (210) is attached to the device (200) using a connecting block (265) that connects the wheel (260) and the two rails (220) at their angled ends (221). The rails (220) have five (5) notches (224) cut out to form teeth (225) on the rails that the movable T-bar (235) rests in between. (The number of notches may vary in other embodiments). The movable T-bar (235) is attached to the support (230) by a T-connector (236) that connects the T-bar (235) to the support bar (237). The support bar (237) is then connected to the plate (242) of the bed (240) with a rail end hinge (238). The support (230) is able to be moved in order to allow the user the ability to tip back further into a wheelie while training without being inhibited by the bed (240). If the user falls further back and cannot right the wheelchair (210) before tipping backward, the bed (240) catches the user and wheelchair (210). The farther the notch (224) the movable T-bar (235) is placed into from the back of the wheelchair, the farther the bed (240) is from the back of the wheelchair allowing the user more freedom to test their balancing skills. The bed (240) is made up of the plate (242) that is attached to the support bar (237) with the rail end hinge (238). The plate couples the two arms (241) of the bed (240) that are parallel to one another. The arms (241) are attached to the rails (220) by way of a hinge (245) that is attached to a hinge wedge (246), which is then screwed onto the rails (220). The hinge wedge (246) ensures that arms (241) of the bed (240) remain parallel rather than being at the same angle as the rails (220). At the square end (222) of the rails (220), the hooks (270) are attached to the device (200). The hooks (270) are coupled or hooked onto the wheelchair axle (215), which allows the device (200) to sit at the appropriate angle to ensure safe use. In this embodiment, the angle is fifteen (15) degrees.

Figure 11:
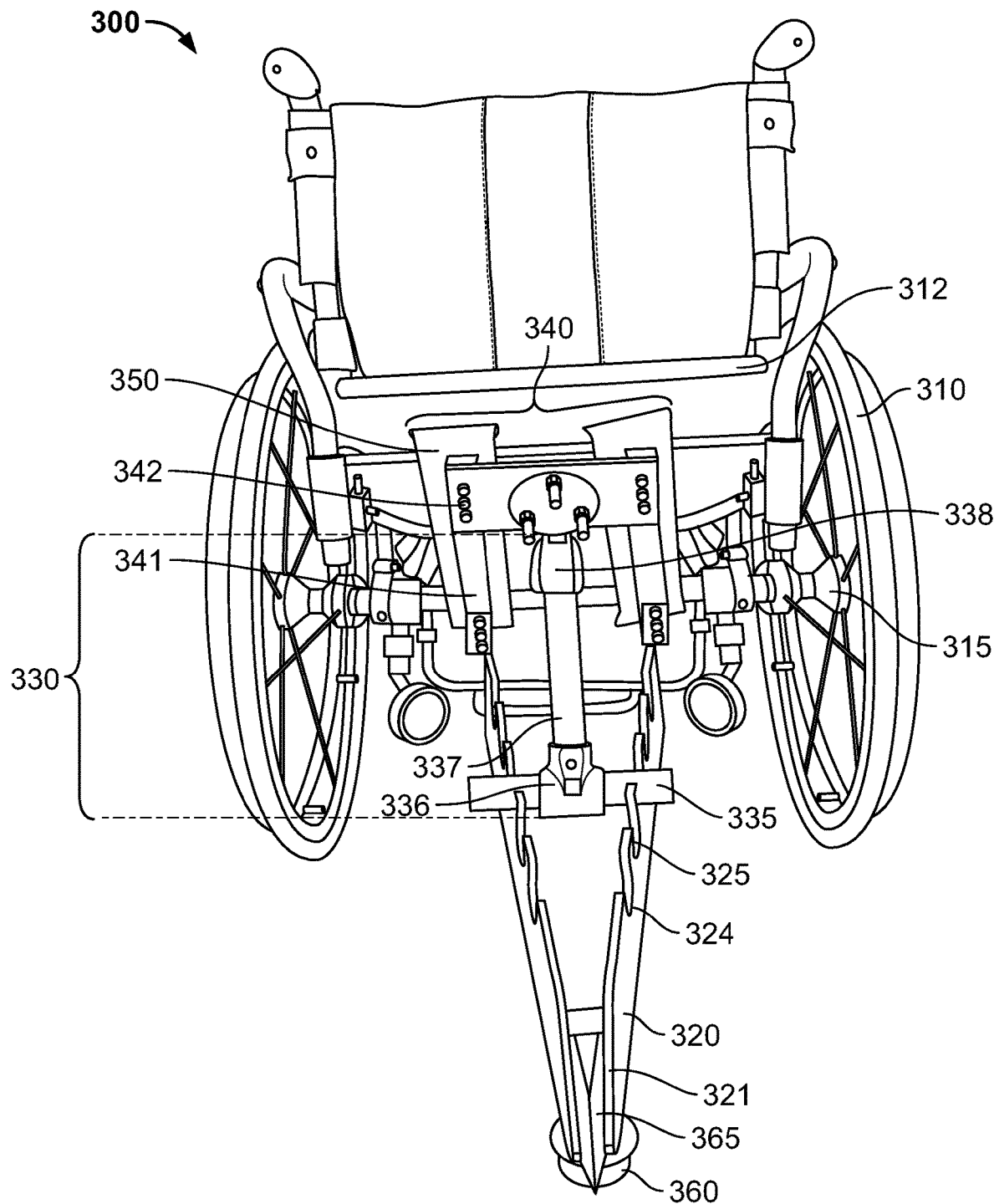
FIG. 11 depicts a rear view of a further embodiment, device 300.

FIG. 11 depicts a rear view of the device (300). The wheel (360) is attached to the connecting block (365) which also connects both rails (320) at their angled ends (321). The wheel (360) allows the device (300) to move with the wheelchair (310) while the user is attempting wheelies. The rails (320) have notches (324) cut out of them to create teeth (325) in between which the movable traverse support T-bar (335) rests to change the angle between the bed (340) and the rails (320). The movable T-bar (335) is connected with the vertical or upright support bar (337) by a T connector (336). The support (330) is connected to the bed (340) through the use of a rail end hinge (338) connected to the plate (342) of the bed (340). The bed (340) consists of two arms (341) parallel to one another with bumpers (350) attached to them to dampen the impact of the wheelchair (310) and user contacting the device (300) when the user tips too far backward while training. The arms (341) are parallel to one another through the use of a hinge (345) and hinge wedge (346) attached to the rails (320). When the wheelchair (310) tips backward too far, the back bar (312) of the wheelchair (310) makes impact with the bumpers (350), which stop the wheelchair (310) and user from falling all the way backward to the ground.

Figure 12:
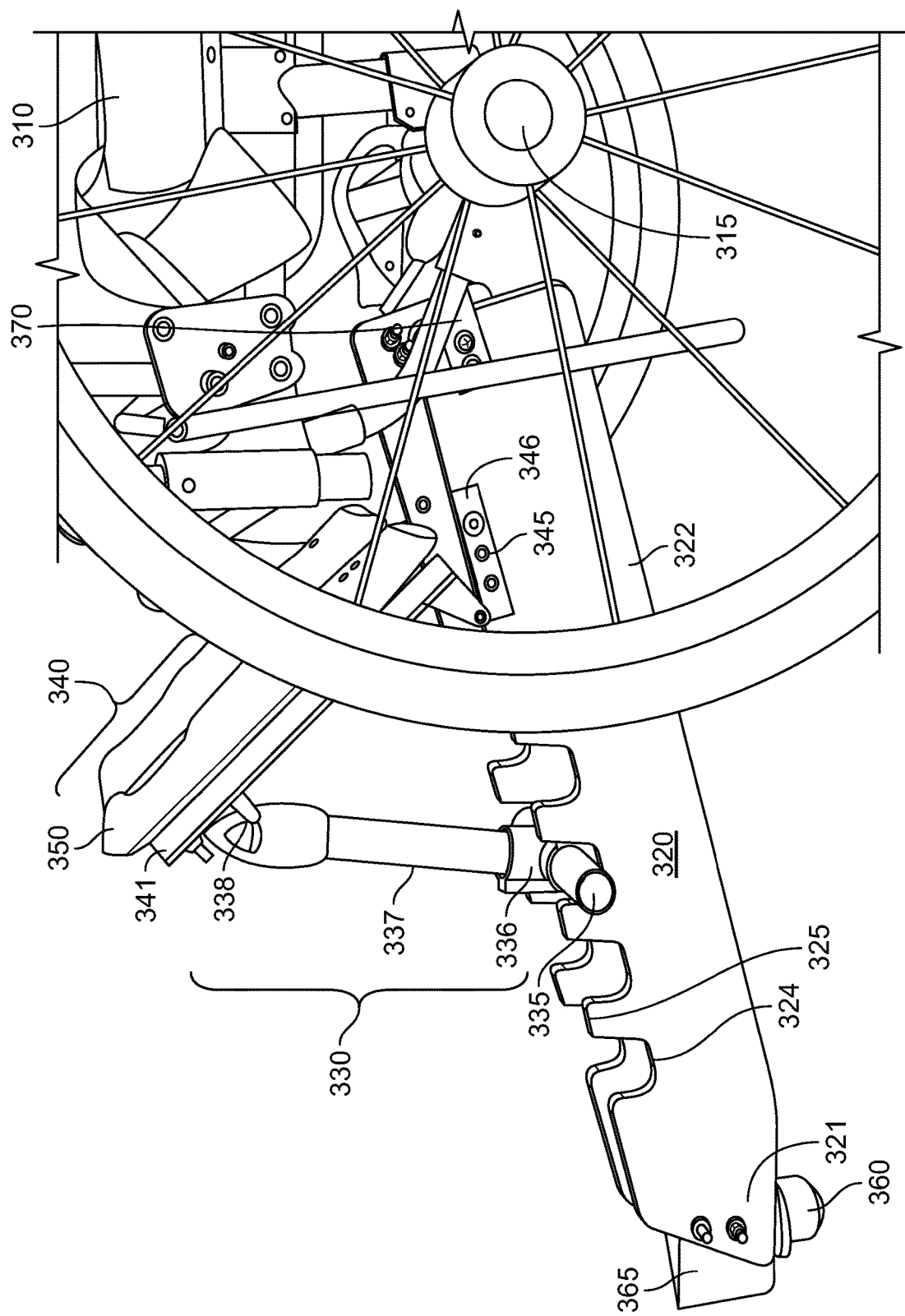
FIG. 12 depicts a side view of the device of FIG. 11.
Figure 13:
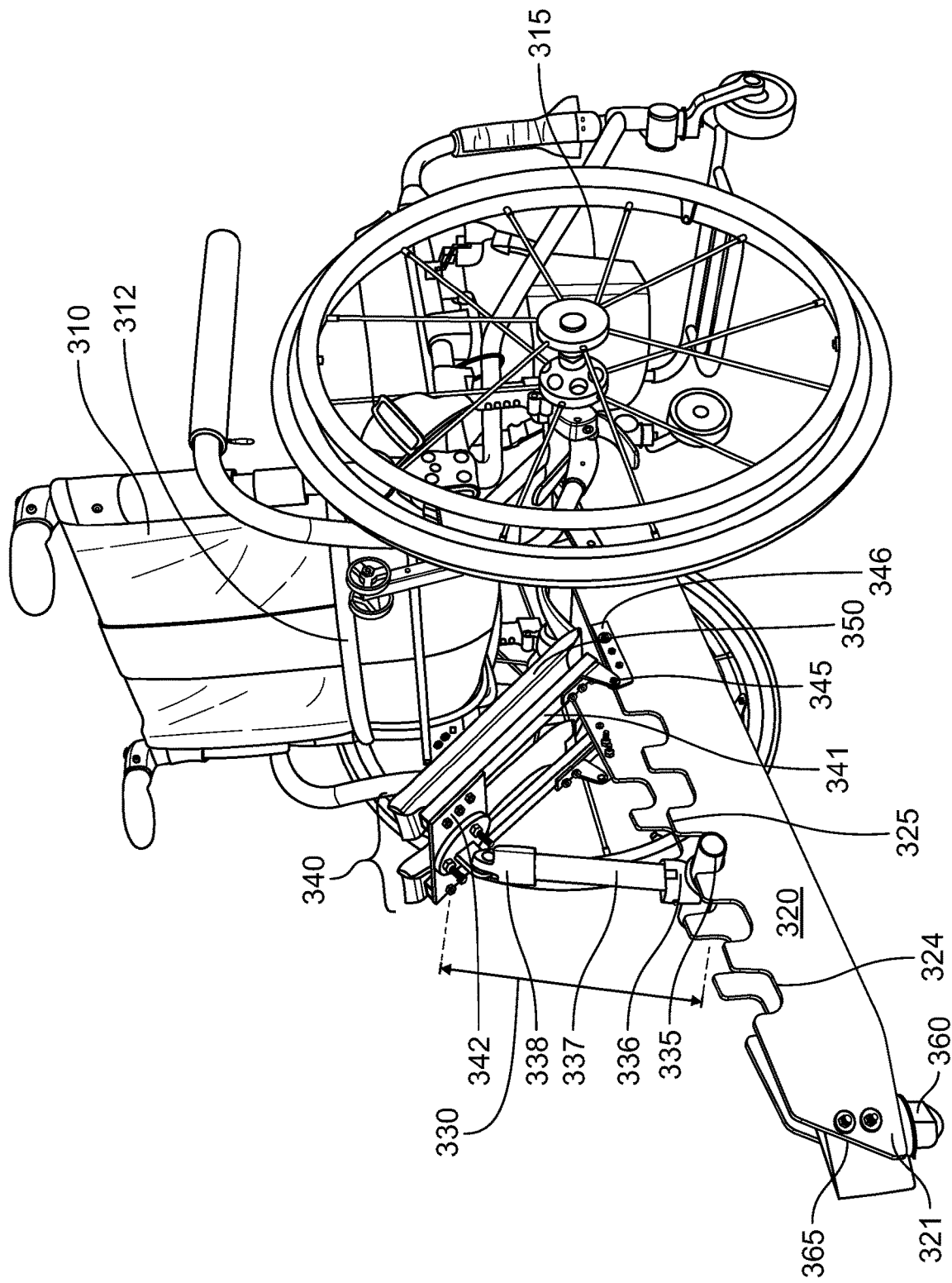
FIG. 13 depicts another side view of the device of FIG. 11 from a rear perspective.

FIGS. 12 and 13 depict side views of the device (300). The device (300) is attached to the wheelchair (310) using hooks (370) that are attached to the axle (315) of the wheelchair (310). The hooks (370) are attached to the rails (320) on their square end (322). Adjacent to and behind the attachment of the hooks (370) on the rails (320) is the hinge (345) that connects the bed (340) and support (330) to the rails (320). In operation, the hooks (370) allow the axle (315) to rotate freely while the hooks (370) remain stationary relative to the wheelchair. In other words, the axle (315) rotates relative to the ground with the wheelchair (310) as the wheelchair (310) tips back, while the hooks (370) do not rotate relative to the ground. The hinges (345) are attached to the rails (320) by way of a hinge wedge (346) that allows the arms (341) of the bed (340) to remain parallel to one another. The arms (341) of the bed (340) have a bumper (350) attached to each arm (341). The bumpers (350) ensure that if the wheelchair (310) tips back too far and the wheelchair (310) needs to be caught by the bed (340), the bumpers (350) make first contact with the crossbar (312) of the wheelchair (310) ensuring that the impact is lessened. The arms (341) with the bumpers (350) attached are connected through the use of a plate (342). The plate (342) has a rail end hinge (338) attached that connects the support bar (337) of the movable support (330) to the bed (340). At the end of the support bar (337) is the T-connector (336) that engages the movable T-bar (335). The movable T-bar (335) may be placed in any of the notches (324) between the teeth (325) on the rail (320) to change the angle between the bed (340) and the wheelchair (310). The change in the angle allows the user to perform higher wheelies when training without the crossbar (312) of the wheelchair (310) making contact with the bumpers (350). This encourages the user to practice finding their center of gravity and balancing while still having the bed (340) and bumpers (350) as a safety net.

A majority of the metal components of this device (100/200/300/400) may be made out of 6061 grade aluminum in order to hold both the weight of the patient and the wheelchair. In an embodiment, the maximum weight may be about 250 pounds. Any other suitable material may be used that is sufficient to support the weight of the patient and the wheelchair.

The rails (320) of this device (300) are made of ¼ inch aluminum plates (any suitable material may be used) which have multiple notches (324) cut out of the rails (320) to accommodate the movable T-Bar (335). These rails (320) with the integration of the notches (324) allow users to adjust the bed (340) to a desired angle from the horizontal by manually shifting the movable T-bar (335) which supports the bed (340) with the bumpers (350). The toothed rails (320) must be able to perform two critical functions: load bearing and allowing for complete packaging of all components. In order to avoid the rail (320) shearing under the loads experienced while supporting a wheelchair (310) that has been tipped over, the height of the teeth (325) should be approximately one third (⅓) of the total height of the rail (320).

Figure 9:
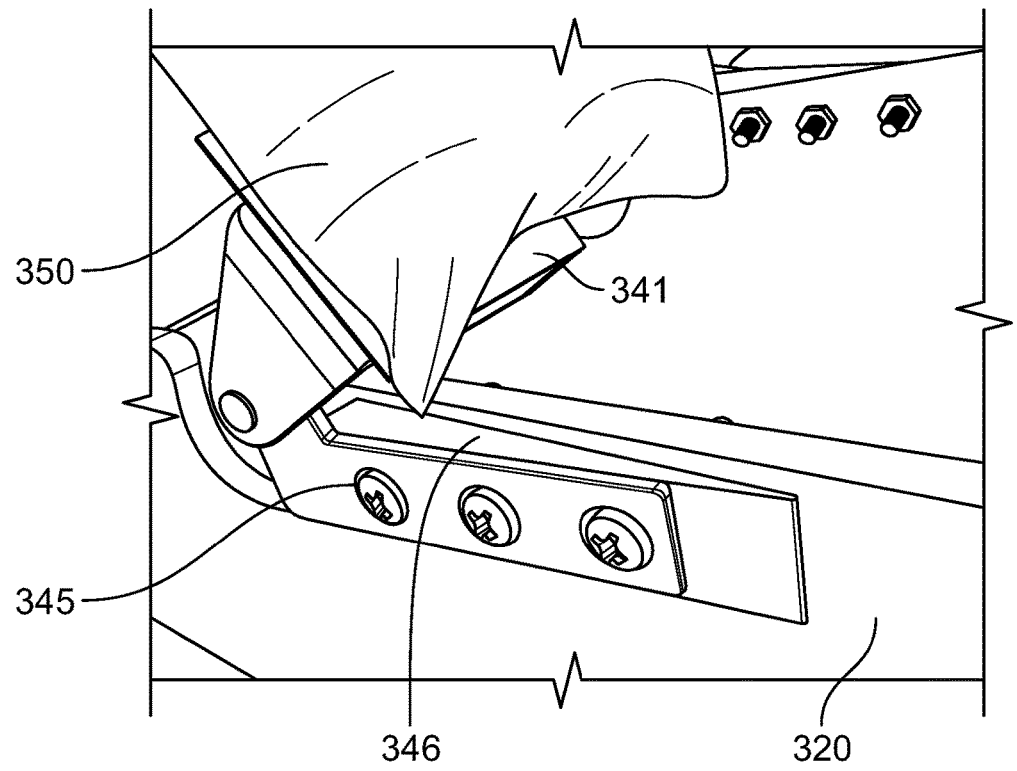
FIG. 9 depicts a close-up of the connection between the rails and the supportive frame for the bed of a further embodiment, device 300.

FIG. 9 depicts a close-up view of the connection between the rails (320) and the arms (341) of the bed (340). Each rail (320) has a hinge wedge (346) that allows the hinges (345) on either rail (320) to remain parallel to one another, rather than placing them at an angle comparable to the angle between the two rails (320). Attached to each hinge wedge (346) is the hinge (345) that connects the arms (341) of the bed (340).

The bed (340) element of the device (300) may provide a dampening action to help ensure the safety of users. The bumpers (350) on the bed (340) create a dampening effect by absorbing the energy of the impact from the user and the wheelchair (310). As the back of the wheelchair (310) sinks into the bumpers (350) of the bed (340), the force is distributed throughout a greater surface area. This feature alleviates a portion of the force that may lead to injury.

The bed (340) which comes into frequent contact with the wheelchair (310) throughout the course of training may be made of sufficiently durable material in order to support the weight and repeated impact. In the device (300), the bed consists of two parallel rectangular arms (341). Each arm (341) protrudes upward from a hinge (345) fixed to either rail (320) and then connected to either side of a horizontal plate (342). This forms the frame of the bed (340) where two bumpers (350) are attached to prevent the bed (340) and/or wheelchair (310) from being damaged with repeated contact. Each bumper may comprise a plastic or other suitable material rod (351) created by cutting a one (1) inch diameter by nine (9) inch long solid plastic rod in half to create two (2) rods with semi-circular cross sections. Curved open cell foam (352) may then be attached to the plastic rods (351) and woven fabric (or any other suitable material) (353) may be used to cover the foam (352). The bed (340) may then be attached to the arms (341) with washers and screws.

Figure 10:
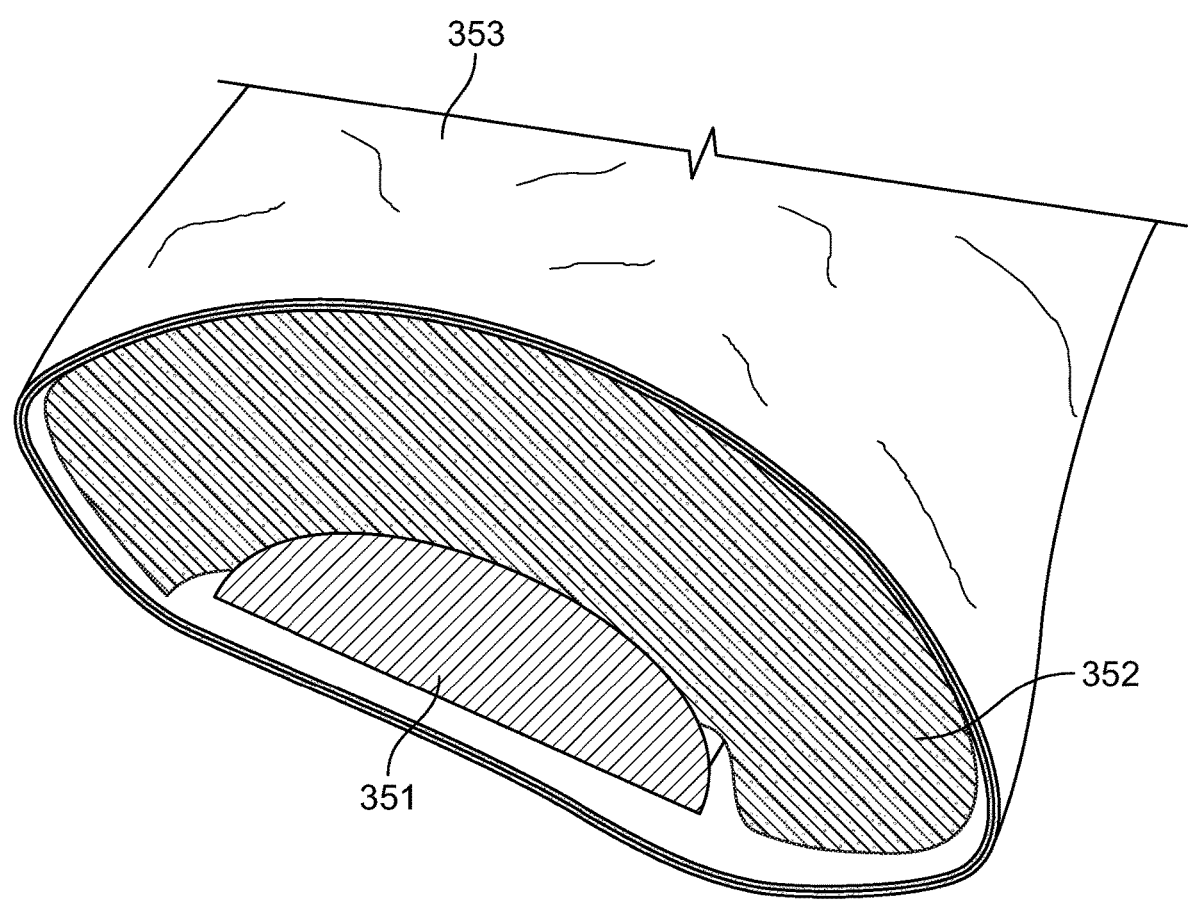
FIG. 10 depicts a cross section of the bumper of FIG. 9.

FIG. 10 depicts a cross section of the bumper (350) of the device (300). The bumper (350) is comprised of a semicircular cut plastic rod (351) covered with an impact absorber (352) and further covered in a woven fabric, or other suitable material, covering (353). When the back of the wheelchair (310) makes contact with the bumper (350), the open cell foam (352) absorbs the force of the impact into the plastic rod (351), through the rest of the bed (340), into the support (330), through the rails (320), and out through the wheel (360) to the floor. This protects the user from hitting the bed (340) with such an impact to cause further injury to themselves. The covering (353) allows for the bumpers (350) to require little maintenance over prolonged use.

At the square end of each rail (322), a coated nonmarring hook (370) may be connected in order to connect to the wheelchair (310) of the user by hooking around the axle of the wheelchair (315). The weight of the device (300) and the fixed angle between the rails (320) can hold the hooks (370) in place. These hooks (370) may be made of the appropriate material and the appropriate size to fit the wheelchair (310) being used. A clamping system could also be used in order to better accommodate other types of wheelchairs.

Figure 14:
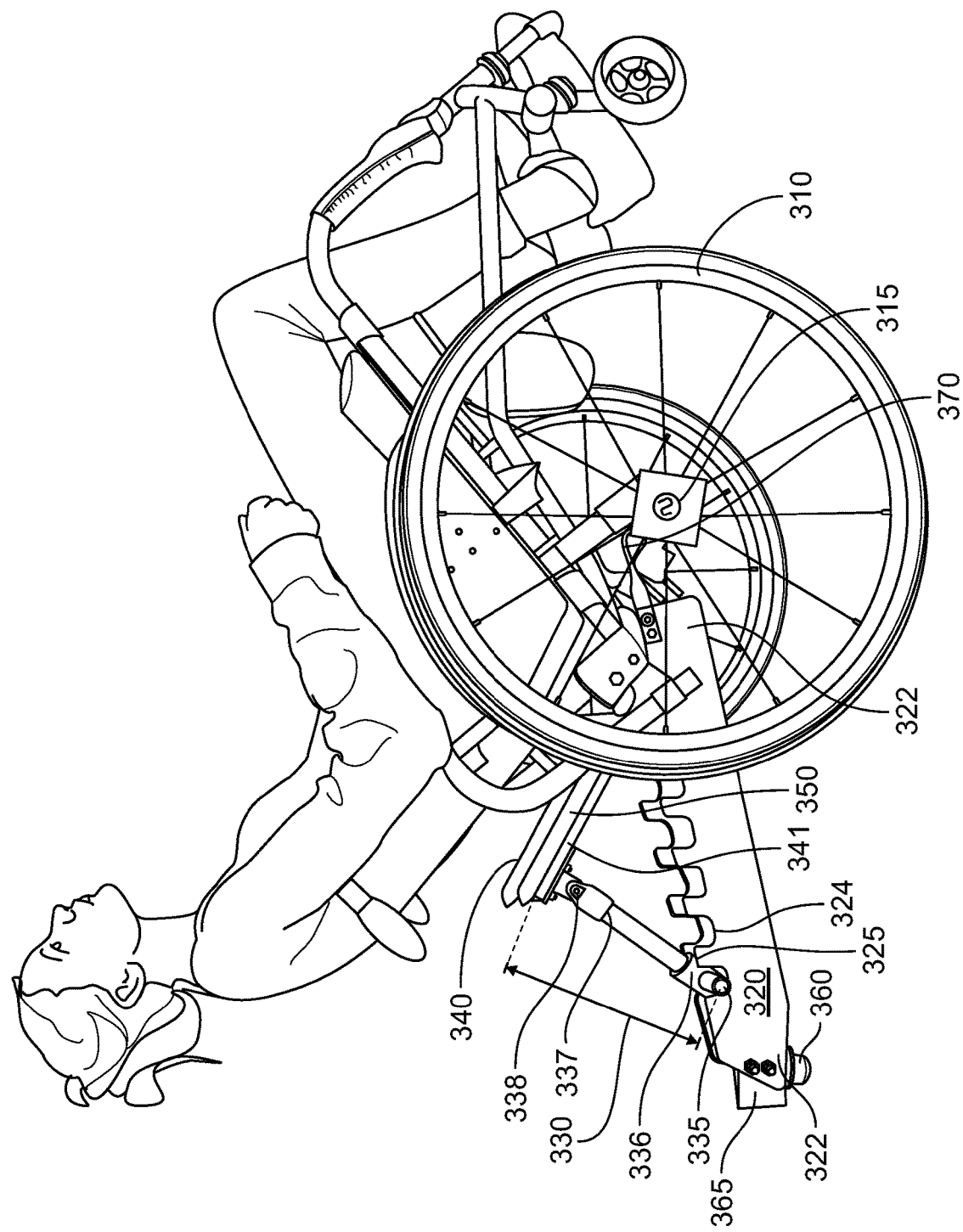
FIG. 14 depicts a side view of the device of FIG. 11 while in use.

FIG. 14 depicts the device (300) in use. The device (300) is attached to the axle (315) of the wheelchair (310) by way of hooks (370). Each hook (370) is attached to the square end (322) of each rail (320). The rails (320) are brought together through the use of a connecting block (365) that also attaches the wheel (360). Through the use of the wheel (360) and hooks (370) the device (300) can move with the wheelchair (310) throughout the user's training. The wheel (360) allows the device (300) full range of motion in order to allow the user to move the wheelchair (310) while training regular wheelies as well as when training dynamic wheelies. When training to perform the wheelies, the user tips back in the wheelchair (310) and attempts to find a center of balance with the two front wheels off the ground. During the training period, the balance is often lost and the user falls backwards. With the use of the device (300), the wheelchair (310) falls backward into the bumpers (350) of the bed (340) of the device (300). The bumpers (350) absorb the force of the impact and disperse it throughout the device (300) and into the floor minimizing the impact and lessening the possibility of harm to the user during training. The bumpers (350) are attached to the arms (341) of the bed (350) and are connected by a plate (342). The arms (341) are attached to the rails (320) of the device (300) through the use of hinges (345) and hinge wedges (346). The hinge wedges (346) allow the arms (341) to remain parallel to one another. The bed (340) can be adjusted in height through the use of the movable support (330). The movable support (330) is attached to the bed (340) through a rail end hinge (338) attached to the plate (342) of the bed (340). Attached to the rail end hinge (338) is the support bar (337) which engages the T-connector (336) and finally the movable T-bar (335). The angle of the bed (340) is adjusted by moving the movable support (330). This is done by lifting the bed (340) and moving the movable T-bar (335) into the different notches (324) between the teeth (325) on the rails (320). This allows the angle to increase or decrease between the bed (340) and the wheelchair (310). The user can test his/her balance at a greater angle without the fear of falling to the ground or the need for the trainer to catch the wheelchair (310) when it falls. In FIG. 14, the user has been able to balance and therefore is not in need of the bumpers (350) and bed (340) to catch their fall. The device (300) is a safety net when training to make the user feel safer.

For suitable training, the user may need to be able to tip the front wheels at least 6" to 8" from the ground to the bottom of the front wheels of the wheelchair (310). This allows the user to learn to navigate over large curbs. The user also preferably should be able to rotate 360 degrees in order to train for dynamic wheelies.

In other implementations of this device (300), the bed (340) may be made compatible with wheelchairs (310) that do not have a crossbar (312) where the bed (340) normally catches the wheelchair (310). Modifications can be made to device (300) to allow it to be used with a wheelchair (310) without a central wheel axle (315), for example, by having the device (300) attach without using the hook (370) or clamp systems.

This device (300) is intended to be used by patients that are mobile through the use of a wheelchair (310) during their wheelchair (310) training with the help of a physical therapist in the beginning and possible with the help of someone other than the physical therapist after the user becomes more comfortable with the process. The device (300) may be used specifically to teach wheelchair (310) users to learn and control their center of gravity when performing a wheelie in a wheelchair to make sure they do not tip too far backwards when attempting to get over obstacles in the real world, like curbs.

The device (300) is connected to the wheelchair (310) by hooks (370) attached to the wheel axle (315) of the wheelchair (310) but in other embodiments of the device (300), other methods of attachment may be used. The device (300) is positioned in a way that the vertex of the rails (320) and consequently the wheel (360) is directly behind the center of the wheelchair (310).

The device (300) may be used by attaching the device (300) to the wheelchair (310) as described above. The therapist or other appropriate person adjust the supporting rod (330) and movable T-Bar (335) to the appropriate notch (324) of the rail (320) to control how far the user can tip back in the wheelchair (310) before they will be caught by the bed (340). The supporting rod (337) and movable T-bar (335)

may be adjusted by lifting the bed (340) and lowering the lower bar (335) into the appropriate notch (324) of the rail (320). The user then attempts to pull the forward wheels of the wheelchair (310) up off the floor and balance at a certain angle on the rear wheels of the wheelchair (310). The user attempts to balance at a certain height of the forward wheels of the wheelchair (310). If the user loses control of the wheelie and the wheelchair (310) tips backward rather than falling forward (meaning their center of gravity moved behind them instead of in front of them) the user would fall backward into the bumpers (350) of the bed (340). These bumpers (350) of the bed (340) provide a solid but soft landing to their fall to as the bumper (350) absorbs the force of the user and the wheelchair (310) which is then dissipated through the plate (342) behind the bumpers (350) which is further dissipated through the arms (341) and then through the rails (320) and into the wheel (360) and finally through the floor. This reduces the risk of injury to the user and the physical therapist that would otherwise need to catch the user and the wheelchair. As the user progresses in their training, the therapist can adjust the supporting rod (337) and movable T-bar (335) to move the bed (340) further from the back of the wheelchair (310). As the user moves to get into the wheelie position as well as to turn while in the wheelie position, the wheel (360) at the vertex (365) of the rails (320) allows the device (300) to move with the wheelchair (310) to ensure that it does not impede the training of the user.

Figure 16A:
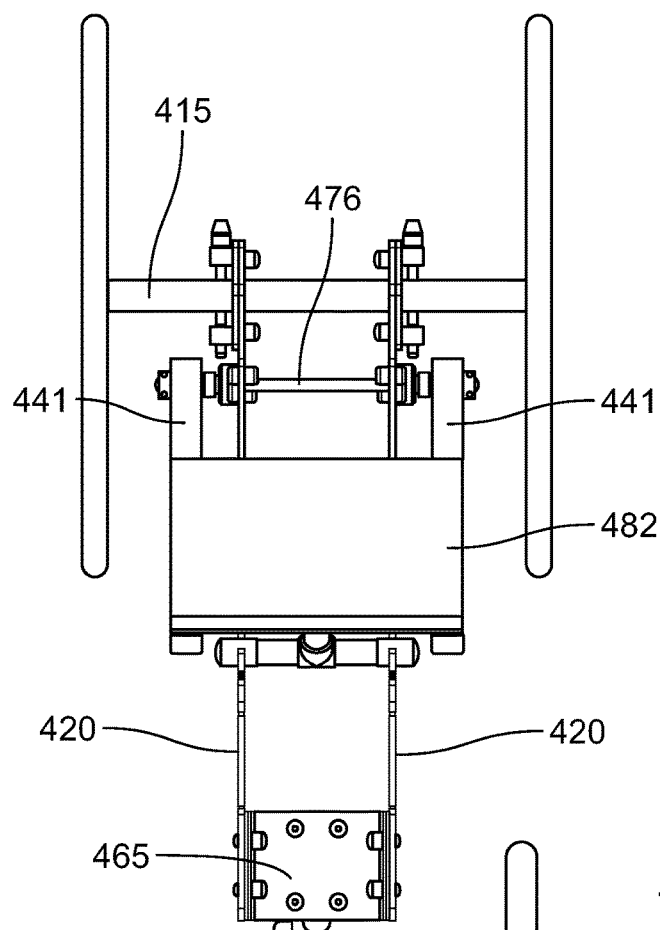
FIG. 16($a$) is a top view of the device of FIG. 15.
Figure 16B:
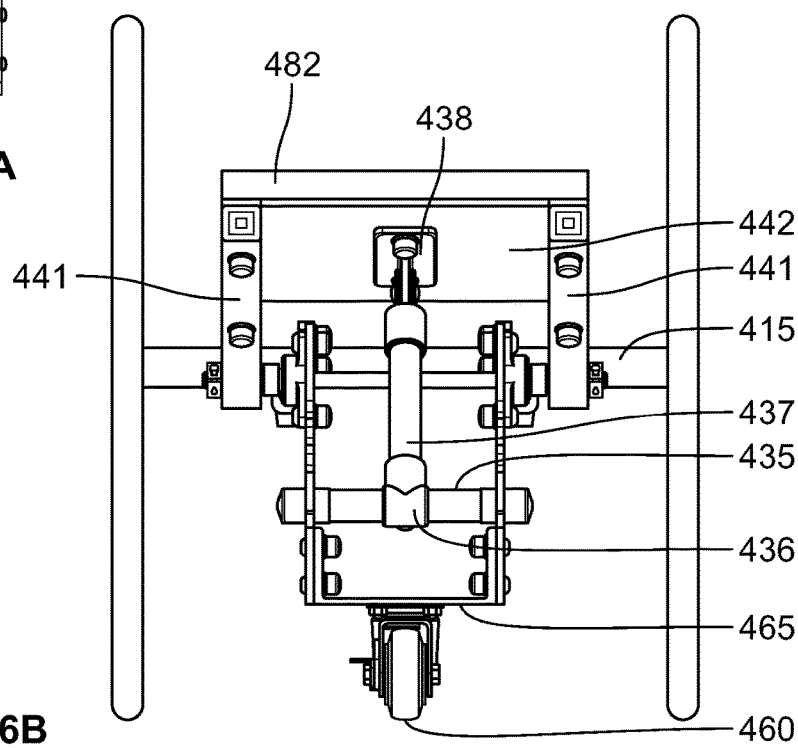
Figure 16C:
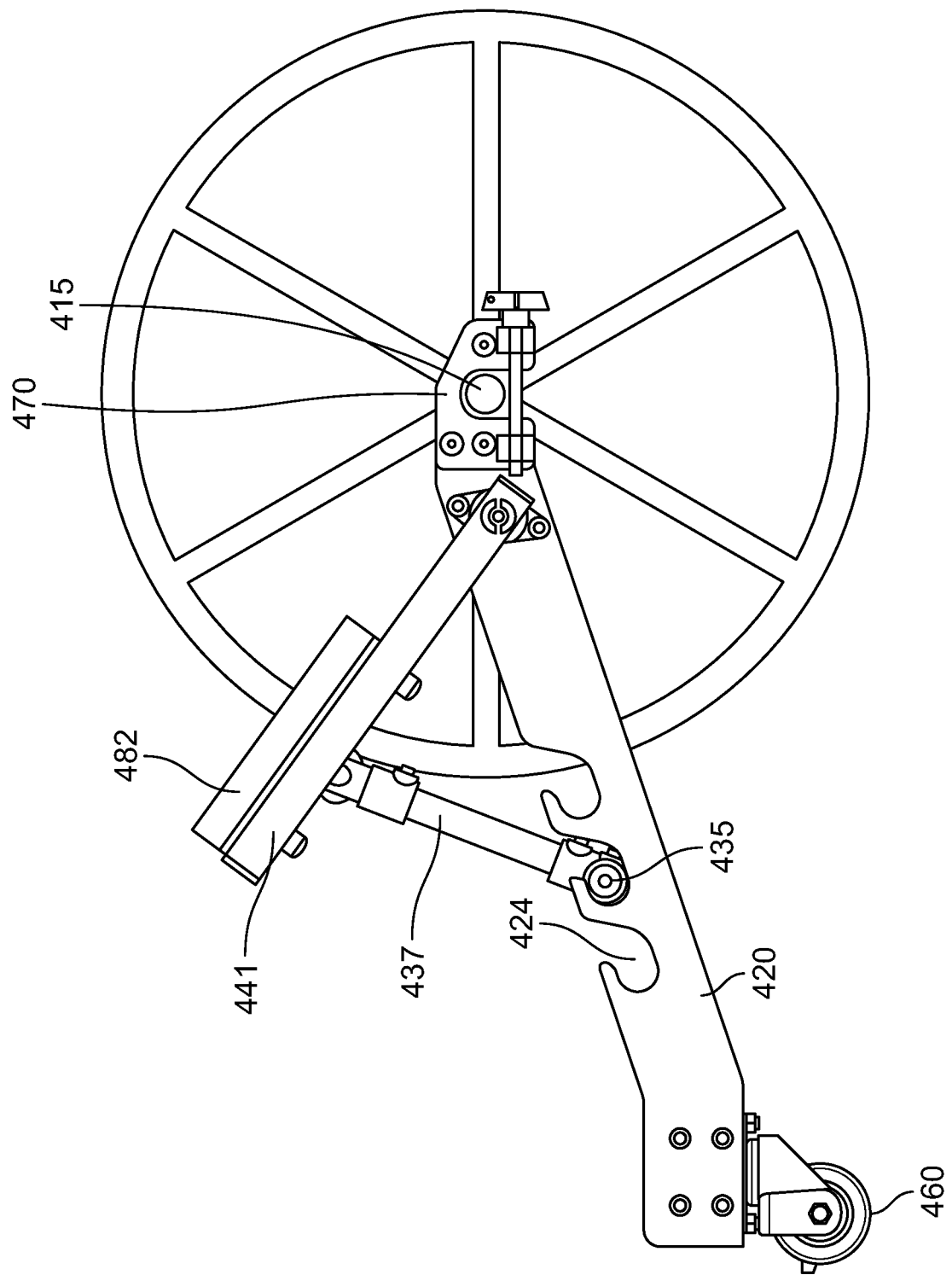
Figure 17:
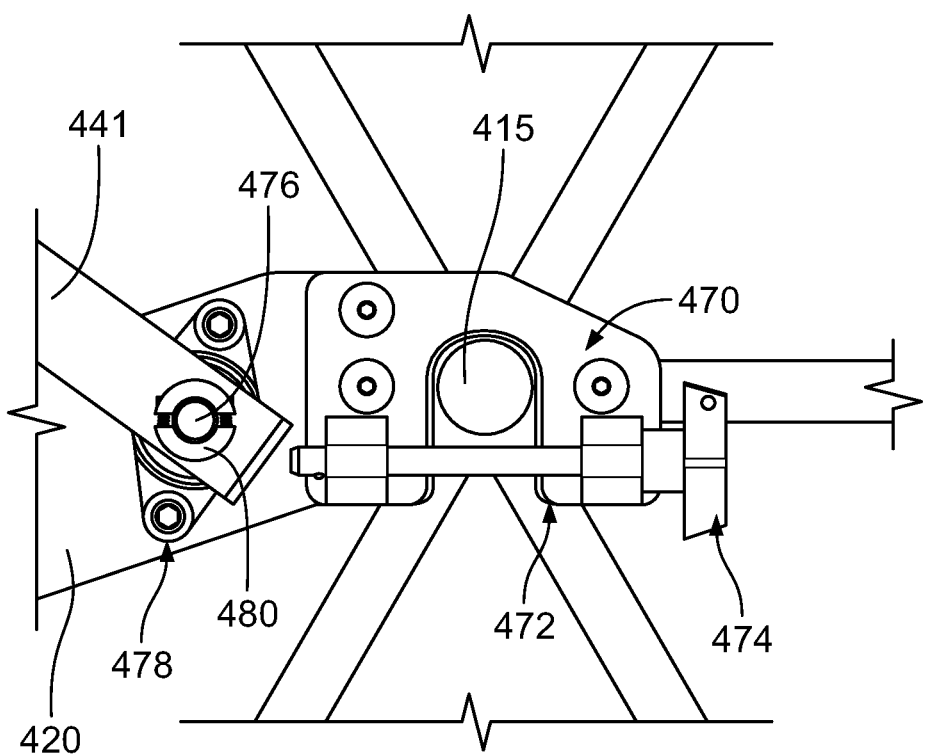
FIG. 17 is a close up view of one end of a rail of the device of FIG. 15.

FIG. 15-17 depict a further embodiment of the present application, device 400, to be used with wheelchair 410. Although these figures depict only the wheels and main axle 415 of the wheelchair 410, it should be understood the wheelchair 410 would have all the features of a typical wheelchair, such as wheelchair 310. Device 400 structurally is similar to device 300 and operates in the same manner as device 300 in catching the back of a wheelchair. Similar reference numerals denote similar features among the various embodiments. The main differences between device 300 and device 400 will be discussed in detail below.

As can be seen in FIGS. 16(C) and 17, the one end of the rails 420 is provided with a surface 470 for being operatively positioned on the axle 415 of the wheelchair 410. The surface may comprise a separate curved member 470 in the shape of a hook and configured to be mounted on the end of the rail 420 by suitable fasteners. There is a tight tolerance between the hook 470 and the axle 415, thereby reducing the opportunity for the two members to fall out of engagement. The inside surface of the hook 470 may be covered with a layer of silicone rubber material 472 to prevent the axle 415 from being damaged by the hook 470 of the rail 420. The hook 470 is further provided with a quick release T-handle pin 474, shown in FIG. 17, to ensure that the axle 415 does not fall out of engagement with the hook 470 of the rail 420. Once the hook 470 is placed over the axle 415, the pin 474 is moved to its closed position, thereby trapping the axle 415 in engagement with the hook 470.

As can be appreciated from FIG. 16(A), the ends of rails 420 of the device 400 do not meet together at wheel 460 to make the tip of a wedge shape, as in the other embodiments. Rather, the device 400 is provided with a U-shaped channel 465. Referring to FIG. 16(B), the wheel 460 is mounted to a bottom surface of the U-shaped channel 465 and the rails 420 are mounted to the sides of the channel 465 by suitable fasteners. Thus, the rails 420 remain in a parallel, spaced apart relationship. Because the rails 420 are not angled with respect to each other, they do not require custom manufacture and the arms 441 do not require the use of block 346 and hinge 345, as does the device 300. Instead, a rotary shaft 476 extends transversely across the rails 420 and is operatively coupled to the arms 441. Specifically, as seen in FIG. 17, each end of the rotary shaft 476 is fitted through a sleeve bearing 478 mounted on the respective rail and then inserted through an opening in the respective arm 441. A clamping collar shaft 480 is provided on each end of the shaft 476 extending past the arm 441 in order to keep the elements operatively coupled. Due to this arrangement, the arms 441 can rotate with respect the rails 420 and thus the angle of the bed 440 with respect to the rails 420 can be adjusted.

As can be seen from FIGS. 15 and 16(B), the bed 440 includes a plate 442 extending across the arms 441. Instead of bumpers used with the other embodiments of the device, the bed 440 is provided with a layer of EVA foam 482 across the entire plate 442 for cushioning the impact resulting from the wheelchair 410 making contact with the bed 440. The foam 482 may be tear-resistant and shock absorbent.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims.

What is claimed is:

1. A device for supporting a wheelchair, comprising:
   a. a frame comprising two rails extending from a first end of the frame to a second end of the frame, the first end of the frame configured to be attached to an axle of the wheelchair, the second end of the frame configured to be attached to a wheel for allowing translation of the device over a surface, the frame configured to be positioned behind a back of the wheelchair; and
   b. a support system coupled to the frame, the support system positioned at an angle with respect to the frame to catch the back of the wheelchair upon reclining of the wheelchair, the position of the support system with respect to the frame being adjustable in order to catch the wheelchair at varying angles of reclining;
       wherein each rail has a number of notches provided along an upper surface, the notches forming teeth for interacting with the support system to allow the position of the support system with respect to the frame to be adjusted.

2. The device of claim 1 wherein each rail has a first end, the first end of each rail is provided with a curved member for attaching to a rear axle of the wheelchair.

3. The device of claim 2 wherein the rails of the frame are configured in a wedge shape having a wider end and a tip.

4. The device of claim 3 wherein each rail has a second end, the second ends of the rails coming together to form the tip of the wedge shape.

5. The device of claim 4 wherein a connector wedge is provided where the second ends of the rails come together, the wheel operatively coupled to the connector wedge.

6. The device of claim 2 wherein each rail has a second end, the second ends of the rails coupled to a U-shaped channel member, the wheel operatively coupled to the channel member.

7. The device of claim 1 wherein the support system comprises a bed for catching and supporting the wheelchair back upon reclining of the wheelchair, a vertical support bar coupled to the bed, and a traverse support bar coupled to the vertical bar, the bars configured for positioning the bed of the support system at different angles with respect to the frame to accommodate different angles of reclining of the wheelchair.

8. The device of claim 7 wherein the traverse support bar is configured to be inserted into notches on the rails of the frame.

9. The device of claim 7 wherein a connector is positioned between the transverse support bar and the vertical support bar for coupling the bars.

10. The device of claim 7 wherein the support bars are configured in the shape of the letter T.

11. The device of claim 7 wherein the support system further consists of two arms parallel to one another and coupled by a plate extending transversely between the arms, the plate positioned adjacent the bed.

12. The device of claim 11 wherein the bed is further provided with shock absorbent material for dampening the impact of the wheelchair against the bed when the wheelchair contacts the bed.

13. The device of claim 11 wherein the arms are hingedly coupled to the rails at an angle with respect to the rails.

14. The device of claim 11 further comprising a rotary shaft extending between the rails and operatively coupled to the arms to enable the arms to be rotatably coupled to the rails to allow the angle of the support system to be adjusted.

15. The device of claim 11 wherein the transverse support bar being configured to mate with any of the notches along the rails, the position of the transverse support bar on the rails determining the angle of the arms and the bed with respect to the frame.

16. The device of claim 7 wherein the bed is pivotably attached to the vertical support bar.

17. A method for training a wheelchair user to perform wheelies with a wheelchair comprising:
  a. Providing a device having a frame with two rails and a support system coupled to the frame for supporting the weight of the wheelchair and the wheel chair user, wherein each of said two rails has a number of notches provided along an upper surface, the notches forming teeth for interacting with the support system to allow the angle of the support system with respect to the frame to be adjusted;
  b. Positioning the device behind a back of the wheelchair and attaching a first end of the frame to an axle of the wheelchair;
  c. Positioning the support system to a desired angle; and
  d. Instructing the user to perform wheelies,
  wherein when the user performs a wheelie and loses balance, the support system catches the back of the wheelchair.

18. The method of claim 17 further comprising adjusting the angle of the support system with respect to the frame depending upon the experience level of the user in performing wheelies.

19. The method of claim 18 wherein the attaching the device to the axle of the wheelchair and the adjusting of the angle of the support system are performed without the use of tools.

* * * * *